United States Patent [19]

Riemer

[11] Patent Number: 4,601,405

[45] Date of Patent: Jul. 22, 1986

[54] CLOSURE SYSTEM FOR A CONTAINERIZED CARGO HANDLING SLEEVE

[75] Inventor: Gerald K. Riemer, Bellevue, Wash.

[73] Assignee: The Boeing Company, Seattle, Wash.

[21] Appl. No.: 781,122

[22] Filed: Sep. 26, 1985

[51] Int. Cl.[4] .............................................. B65D 88/00
[52] U.S. Cl. .................................... 220/1.5; 220/200; 160/368 R
[58] Field of Search ............................. 220/1.5, 200; 160/368 R, 328; 244/118 R, 137 R; 105/366 R

[56] References Cited

U.S. PATENT DOCUMENTS

| | | | |
|---|---|---|---|
| 2,605,064 | 7/1952 | Davis | 244/118 |
| 2,705,461 | 4/1955 | Campbell | 105/369 |
| 3,082,899 | 3/1963 | Squier et al. | 220/1.5 |
| 3,173,539 | 3/1965 | Looker | 206/65 |
| 3,204,581 | 9/1965 | Davidson | 105/369 |
| 3,294,034 | 12/1966 | Bodenheimer et al. | 105/366 |
| 3,371,815 | 3/1968 | Macomber | 220/1.5 |
| 3,591,034 | 7/1971 | Lohr et al. | 220/1.5 |
| 3,618,803 | 11/1971 | Dobberkau et al. | 220/1.5 |
| 3,841,516 | 10/1974 | Marz | 220/1.5 |
| 3,904,064 | 9/1975 | Looker | 220/1.5 |
| 3,915,327 | 10/1975 | Lovich et al. | 220/1.5 |
| 3,951,284 | 4/1976 | Fell et al. | 214/152 |
| 4,046,186 | 9/1977 | Nordstrom | 160/368 |
| 4,046,277 | 9/1977 | Morrison | 220/1.5 |
| 4,538,663 | 9/1985 | Looker | 220/1.5 |

Primary Examiner—George T. Hall
Attorney, Agent, or Firm—Bruce A. Kaser

[57] ABSTRACT

A device is provided for closing an open end (20, 22) of a cargo holding sleeve (10). The device generally consists of three triangular sheets (24, 26, 28) which are respectively connected at a base edge (36) to separate sidewalls of the sleeve (10). The apex portions (46) of the sheets are connected together. Such connection pulls the sheets together thereby causing them to cooperate with each other to close the end of the sleeve.

5 Claims, 2 Drawing Figures

CLOSURE SYSTEM FOR A CONTAINERIZED CARGO HANDLING SLEEVE

TECHNICAL FIELD

This invention relates to cargo or baggage holding sleeves which are used in containerized cargo handling systems. More particularly, the invention relates to a device for closing the open ends of a cargo holding sleeve.

BACKGROUND ART

Systems are currently being designed which can mechanically unload freight or baggage as containerized cargo from an aircraft in rapid fashion. Such systems utilize containers known as "handling sleeves" which hold the freight or baggage. In basic form, these sleeves are hollow, generally rectangular cylinders or parallelepiped bodies fabricated of aluminum or a variety of other suitable materials, and have openings at each end. The sleeves are typically transported between an aircraft and a system designed to unload the contents of the sleeve. The system unloads the contents, for example, in bulk fashion by tilting the sleeve and "pouring" the contents into an unloading chute.

One problem associated with a cargo holding sleeve is that the ends of the sleeve must have the capability of being easily closed and opened to facilitate loading and unloading thereof. Since these sleeves are designed to be unloaded in bulk fashion, sleeve design precludes using typical closure devices such as doors mounted to the sleeve by hinges, either in longitudinal or horizontal fashion. The purpose of the present invention, therefore, is to provide a device for closing the end of a cargo holding sleeve, whereby the contents of the sleeve can be rapidly secured and/or released, and whereby the sleeve is suitable for use in bulk freight and baggage handling systems.

DISCLOSURE OF THE INVENTION

The invention is a device which provides a means for closing an end of a hollow cargo holding sleeve. The device includes a plurality of generally triangular sheets made of flexible material. Each sheet has a first base edge connected to a sidewall of the sleeve, and a pair of second and third edges which converge generally away from the first base edge. The pair of convergent edges converge to form an apex portion of each sheet, and all of the edges make up the generally triangular shape or form of the sheet. The base edge of each respective sheet is connected to a separate sidewall of the sleeve.

The device includes means for connecting the apex portion of each sheet to the apex portions of the other sheets. Such connection pulls the sheets relatively tight and adjacent each other, so that they cooperate with each other to close the end of the sleeve.

The connecting means also connects the sheet apex portions to another sleeve sidewall, which is separate and distinct from the sidewalls to which the base edges of the sheets are connected.

In preferred form, the sleeve is constructed in the shape of a hollow rectangular parallelepiped body. The sleeve has a bottom sidewall, a top sidewall, and two vertical sidewalls connecting the top wall to the bottom wall. Generally, the sleeve cross section is square or slightly rectangular in shape. Of course, except for when the present invention is in use, each end of the sleeve is open.

Even more specifically, one sheet has a base edge connected to one of the vertical sidewalls. Another sheet has a base edge connected to the other of the vertical sidewalls. A third sheet has a base edge connected to the top sidewall. The connecting means connects together the apex portions of the first, second and third sheets, and further connects all of these apex portions to the bottom sidewall of the sleeve.

The connecting means includes a plurality of male buckle fittings, one male fitting each is connected adjacent each apex portion of each sheet. A four-way buckle, connected to the bottom sidewall of the sleeve by a flexible strap, has a plurality of female fittings for receiving and connecting each male fitting to the buckle.

One tightening strap, preferably of webbing or another suitable material, is connected to each sheet substantially adjacent one of its pair of converging edges. This strap extends all the way adjacent the apex portion of the sheet, and further extends a certain distance along and adjacent the sheet's other of the pair of converging edges. The strap is attached to the apex portion in a manner so that the strap forms a loop adjacent the apex portion. The male buckle fitting is connected to the loop. A second tightening strap is connected to the sheet adjacent the other of the pair of converging edges, and a means is provided for connecting the end of the first strap to the end of the second strap. The tightening straps, male buckle fittings, and buckle combine to pull the sheets tight when the male fittings are connected to the buckle.

The present invention provides several desirable advantages. Most importantly, the device provides a good restraint, which can be rapidly secured and released, for holding the contents of a sleeve during aircraft cargo handling. It permits minimal restriction on the flow of cargo contained in the sleeve when cargo is unloaded therefrom in bulk form. Typically, for example, the contents of the sleeve must slide across the bottom sidewall of the sleeve and out through one of the end openings when the male fittings are disconnected from the buckle. The device causes no restriction of flow across the end of the bottom wall, and the flexible sleeves are simply pushed aside as the cargo moves out an opening. The device is also light weight and flexible. It can permit a certain amount of bulging from the sleeve, which also can be advantageous.

BRIEF DESCRIPTION OF THE DRAWINGS

Referring now to the drawings, wherein like reference numerals refer to like parts throughout the various views, and wherein.

BEST MODE FOR CARRYING OUT THE INVENTION

Figure 1:
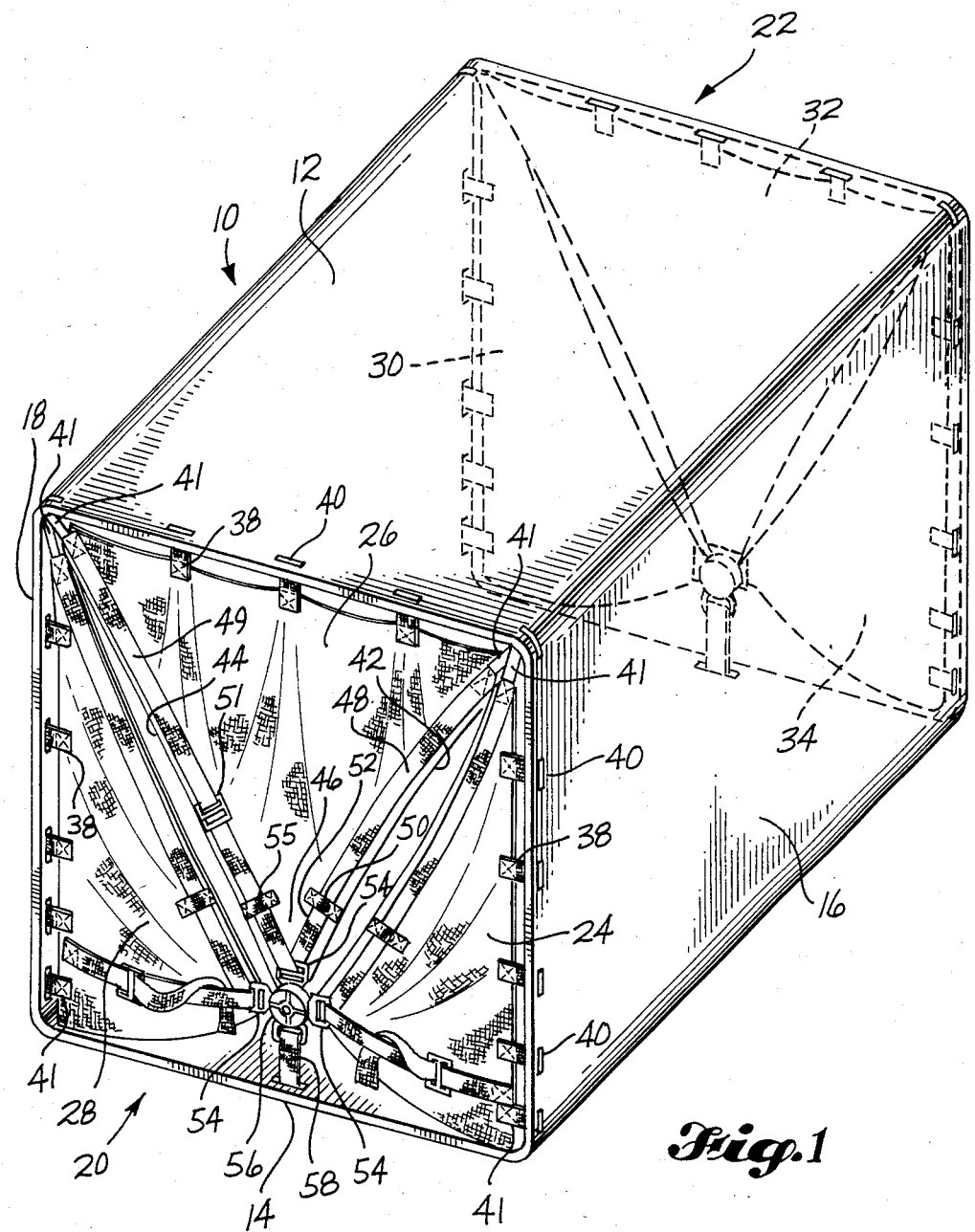
FIG. 1 is a pictorial view of a cargo holding sleeve and shows a closure device constructed in accordance with the invention closing each open end of the sleeve.

Referring now to the drawings, and first to FIG. 1, therein is shown a cargo handling sleeve 10. The sleeve 10 is in the form of a hollow, generally rectangular parallelepiped having a top sidewall 12, a bottom sidewall 14, and a pair of vertical sidewalls 16, 18, which connect the top wall to the bottom wall. The sleeve 10 has two open ends, indicated generally by arrows 20, 22, through which cargo may be loaded or unloaded. The sleeve 10 may be constructed of any suitable material.

Each respective open end 20, 22 is closed by a plurality of generally triangular sheets designated 24, 26, 28, 30, 32 and 34. In preferred form, three sheets are used to close each end 20, 22. Each sheet is made of a suitable fabric or flexible material which can hold cargo inside the sleeve 10.

In preferred form, each sheet has a first base edge 36 which is connected to a sidewall of the sleeve. Each base edge 36 is connected to the sleeve by means of straps 38 which are looped around footman fittings contained in slots 40 near the sleeve's ends 20, 22. The number of straps 38 attaching the base edge 36 to the sleeve may vary. It is only necessary to have a sufficient number of straps 38 to permit a particular sheet to provide good closure of the sleeve ends. It is necessary however, for each sheet to have an additional strap 41 connecting its corner to the corner of the sleeve. The corner straps 41 likewise may be attached to a footman fitting in the sleeve's corners.

Each sheet also has a pair of second and third edges 42, 44 which converge generally away from the base edge 36. The base edge 36 and the convergent edges 42, 44 generally make up the triangular shape of each sheet. The convergent edges 42, 44 converge to form an apex portion 46 at the tip of the triangle.

Figure 2:
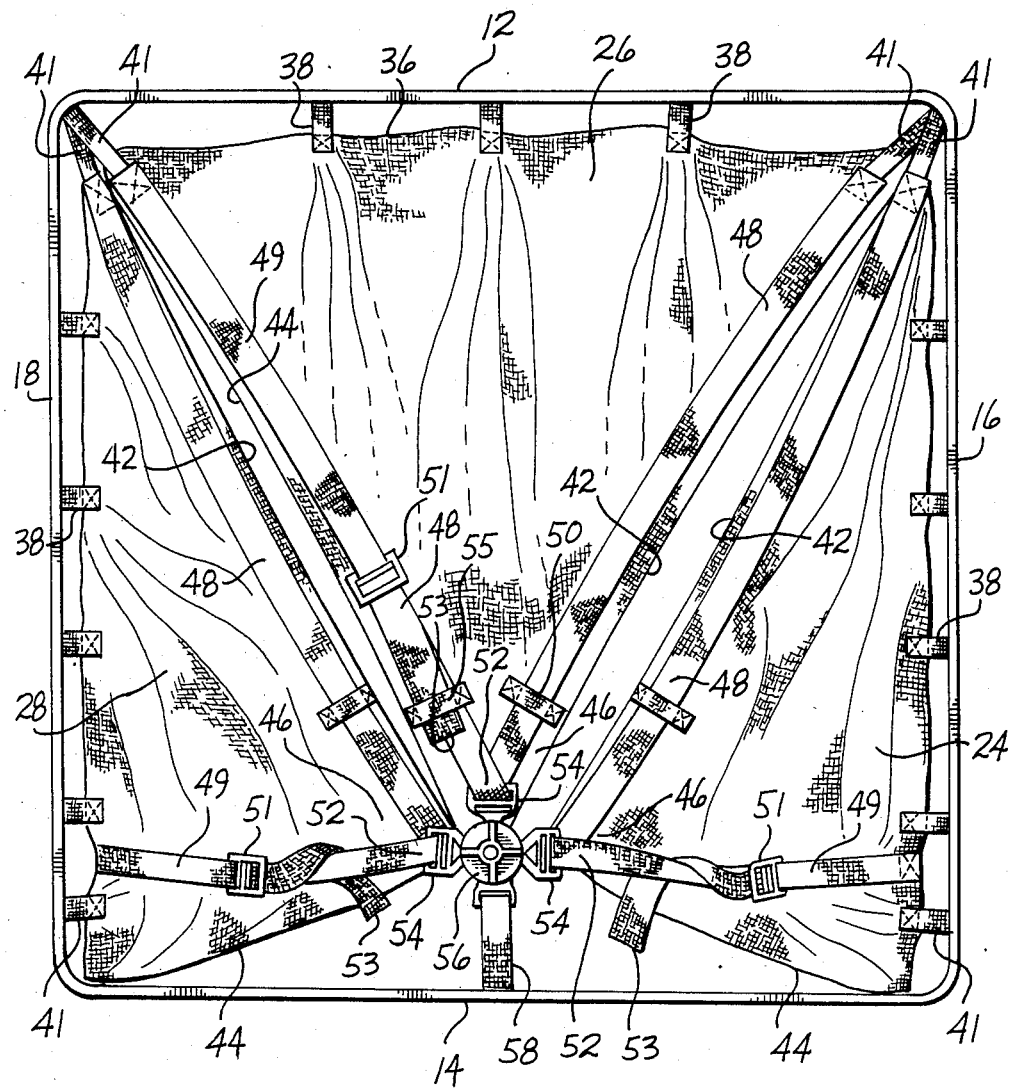
FIG. 2 is an end view of the sleeve and closure device in FIG. 1.

Referring specifically to FIG. 2, each sheet 24, 26, 28 shown therein is connected at its base edge 36 to separate sidewalls 12, 16, 18, respectively. The apex portions 46 of the sheets are connected together by means which will be described later. When the apex portions are connected together, the sheets are pulled adjacent each other in a manner so that they cooperate to substantially close the sleeve end 20.

In preferred form, each sheet may have a first tightening strap 48 connected along a substantial portion of its length to the sheet and adjacent the second edge 42 thereof. The strap 48 may be connected by sewing for example, or otherwise. The first strap 48 is sufficiently long so that it extends along, next to and adjacent the sheet's apex portion, and then extends along and adjacent the third edge 44 of the sheet. Attached near the apex portion 46 of the sheet are belt loops 50, 55 through which the end 53 of the first strap 48 is threaded.

A second strap 49 is sewn to the sheet adjacent the third edge 44 of the sheet. This second strap 49 is sewn to the sheet substantially along its entire length, and at the end thereof is attached a buckle 51. The buckle 51 connects the end 53 of the first strap 48 to the second strap 49. The strap end 53 is loose and not sewn to the sheet from the position where it is threaded in belt loop 50. The belt loops 50, 55 permit the unsewn end 53 of the strap 48 to form a loose loop 52 near the apex portion 46 of the sheet. As a person skilled in the art would realize and as is indicated in FIG. 2, the configuration thus described could be altered somewhat. For example, belt loops like belt loops 50 and 55 need not be employed on the sheets 24, 28 attached to the vertical sidewalls 16, 18. Similarly, the corner straps 41 attached to these side sheets may be connected differently.

A male buckle fitting 54 is connected to the loose loop 52 next to each apex portion 46 and is connectable to a four-way buckle 56. The buckle 56 may be a 4-way seat belt buckle of standard construction having female fittings (not shown in the drawings) for receiving each male fitting 54 attached to each sheet. A flexible strap 58, made of webbing or another suitable material, connects the buckle 56 to another footman fitting connected to the bottom sidewall 14 of the sleeve.

When each male buckle fitting 54 is connected to the buckle 56, each sheet 24, 26, 28 is pulled relatively tight to close the end 20 of the sleeve. The end 53 of the first strap 48 may be adjusted by means of the buckle 51 to adjust tension in each sheet. In this manner, the contents of the sleeve may be permited to bulge outwardly if desired.

A quick turn of the buckle 56 releases the sheets, thereby permiting the contents of the sleeve to move outwardly. When this happens, the sheets 24, 26, 28 are pushed aside during the unloading process, minimally restricting the flow of the sleeve's contents out of the sleeve. As stated previously, this typically occurs when the sleeve 10 is tilted to "pour" the contents of the sleeve down a flared chute, or the like.

The device thus disclosed is inexpensive, can be easily replaced, and meets the requirements of current automated freight and baggage unloading systems. The description provided herein is for illustrative purposes only. It would be apparent to one skilled in the art that the embodiment described above could be altered somewhat without departing from the spirit and scope of the invention. The invention is to be limited, therefore, only by the appended claims which follow.

What is claimed is:

1. For use in handling containerized cargo and baggage, a device for closing an end of a cargo holding sleeve, the device comprising:
   a plurality of generally triangular sheets made of flexible material, each sheet having a base edge connected to a sidewall of said sleeve, and a pair of second and third edges which converge generally away from said base edge, said pair of convergent edges converging to form an apex portion of each sheet, wherein said base edge of each respective sheet is connected to a separate sidewall of said sleeve; and
   means for connecting said apex portion of each sheet to the apex portions of the other sheets, wherein such connection pulls said sheets adjacent each other in a manner so that they cooperate with each other to substantially close said end of said sleeve.

2. The device of claim 1, wherein said connecting means connects said apex portions to another sleeve sidewall which is separate from the sidewalls to which said base edges of said sheets are connected.

3. The device of claim 2, wherein said sleeve is in the form of a hollow generally rectangular parallelepiped body having a bottom sidewall, a top sidewall, and two vertical sidewalls connecting said top wall to said bottom wall, and further having two open ends, and including
   a first sheet whose base edge is connected to one of said vertical sidewalls,
   a second sheet whose base edge is connected to the other of said vertical sidewalls, and
   a third sheet whose base edge is connected to said top sidewall, wherein said connecting means connects together said apex portions of said first, second and third sheets, and connects said apex portions to said bottom sidewall.

4. The device of claim 3, wherein said connecting means comprises a plurality of male seat belt buckle fittings, one each being connected to each apex portion of each sheet, and a seat belt buckle, connected to said bottom sidewall by a flexible strap, said seat belt buckle having a plurality of female fittings for receiving and connecting said male fittings to said buckle.

5. The device of claim 4, including
  a first strap connected to each sheet substantially adjacent one of said pair of converging edges, and extending from said base edge to and adjacent said apex portion, and further extending a certain distance from said apex portion along and adjacent the other of said pair of converging edges, said first strap being attached to said sheet apex portion in a manner so that said strap forms a loop adjacent said apex portion, wherein one of said male buckle fittings is connected to said loop,
  a second strap connected to each sheet adjacent said other of said pair of converging edges, and
  means for connecting the end of said first strap to the end of said second strap.

* * * * *